United States Patent Office.

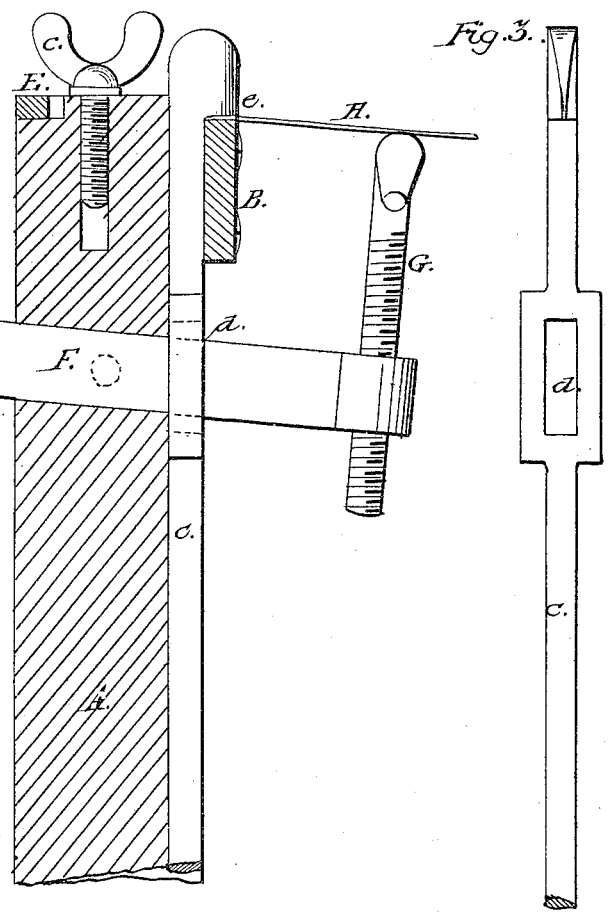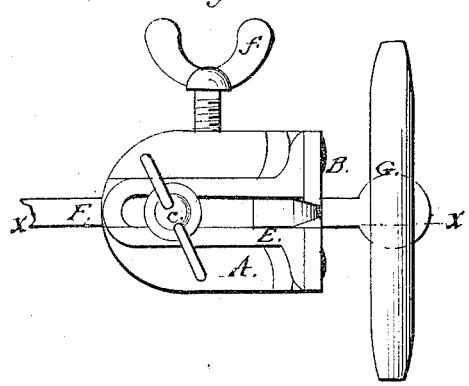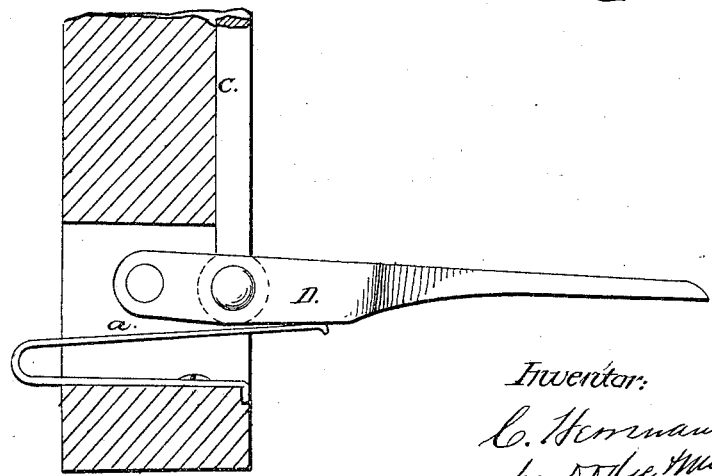

CHARLES HERRMANN, OF EVANSVILLE, INDIANA.

Letters Patent No. 90,538, dated May 25, 1869.

IMPROVEMENT IN SAW-SET.

The Schedule referred to in these Letters Patent and making part of the same.

*To all whom it may concern:*

Be it known that I, CHARLES HERRMANN, of Evansville, in the county of Vanderburg, and State of Indiana, have invented certain new and useful Improvements in Machines for Setting Saws; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to devices for setting the teeth of saws, and consists in the construction of a novel saw-set, so arranged as to be operated by the foot, while the hands are left free to move and manipulate the saw.

In the drawings—

Figure 1 is a longitudinal vertical section on the line $x\ x$ of fig. 2.

Figure 2 is a top plan view, and

Figure 3 is a view of a portion detached.

In constructing my saw-set, I make a wooden stock or post, A, of any size desired, and of the form shown in figs. 1 and 2, and in its front side cut a longitudinal groove, of the proper form to receive an iron bar, C, shaped as shown in fig. 3, and insert it therein, as shown in fig. 1.

The bar C, I construct of such length that its upper end may project above the upper end of the stock A, and provide it with a projecting head or jaw $e$, as shown in fig. 1.

Its lower end, I connect loosely to a treadle, D, which is pivoted in a mortise in the post A, as shown in the same figure.

Underneath the treadle D, within the mortise, I place a spring, $a$, with its loose end bearing against the under side of the treadle, as clearly shown in said fig. 1.

The bar C is arranged to move vertically, and is held in place by a metal plate, B, firmly secured to the front side of the stock, the upper side of which is horizontal with and immediately under the projecting head $e$, in connection with which it forms a pair of jaws for grasping the teeth of a saw.

On the upper end of the stock A, I place horizontally a U-shaped guide, E, by letting it into the wood in such a manner that it may be adjusted longitudinally, and fastened, when adjusted, by a thumb set-screw, $c$, as shown in fig. 2, and also, so that its under side may be on a line with the upper face of the metal plate B, and when moved forward, may straddle the neck of the head $e$, and the jaws formed by it and the metal plate, as clearly shown in the same figure.

Through a mortise in the stock A, and a slot, $d$, in the bar C, I insert a bar, F, having screwed into its front end a T-headed rest, G, in such a manner that it may be adjusted vertically; the bar F being arranged so as to be adjusted longitudinally, and fastened, when adjusted, by the thumb set-screw $f$, as shown in figs. 1 and 2.

In operating my saw-set, thus constructed, I adjust its different parts to suit the size of the saw, and the angle at which I propose to set its teeth.

As the rest G can be adjusted at any desired distance from the post or stock A, and at any desired height, and as the depth of the mouth of the jaws can be regulated by the adjustable slide E, it is obvious that the device may be suited to any-sized saw, so as to give any desired angle to the teeth.

When thus adjusted, I place the blade of a saw, H, in the rest G, and one of its teeth on the upper face of the metal plate B, and then press down with my foot the treadle D, which causes the bar C to move, when the tooth of the saw is caught, and the required set given to it. As soon as this is done, and the pressure removed from the treadle, the spring $a$ carries up the treadle and the bar C, and the tooth is released.

In this way I set every alternate tooth, and then turn the saw over and set every alternate tooth in like manner, giving to the whole an accurate and uniform set.

In the same manner circular saws may be set, and with the same uniformity and accuracy.

Having thus described my invention,

What I claim, is—

1. A saw-set, consisting of the stock A, treadle D, vertical bar C, plate B, adjustable slide E, and adjustable rest G, constructed and arranged to operate substantially as herein described.

2. The treadle D, and vertical bar C, with head $e$, in combination with the plate B, constructed and arranged to operate substantially as herein described, and for the purpose set forth.

CHARLES HERRMANN.

Witnesses:
SEBASTIAN HERRMANN,
JESSE J. UPFIELD.